United States Patent [19]

Hiramatsu

[11] Patent Number: 5,018,886
[45] Date of Patent: May 28, 1991

[54] RECORDING APPARATUS

[75] Inventor: Soichi Hiramatsu, Yokohama, Japan

[73] Assignee: Canon Kabushiki Kaisha, Tokyo, Japan

[21] Appl. No.: 313,515

[22] Filed: Feb. 22, 1989

[30] Foreign Application Priority Data

Feb. 29, 1988 [JP] Japan .................................. 63-046892

[51] Int. Cl.⁵ ................................................ B41J 19/76
[52] U.S. Cl. ..................................... 400/545; 400/554; 400/556
[58] Field of Search ................. 74/553; 400/545, 578, 400/554–556; 464/30, 37, 100, 84

[56] References Cited

U.S. PATENT DOCUMENTS

| | | | |
|---|---|---|---|
| 1,232,658 | 7/1917 | Coles | 464/37 X |
| 2,017,591 | 10/1935 | Dumm | 464/84 |
| 2,028,441 | 1/1936 | Decker | 464/37 X |
| 2,688,857 | 9/1954 | Jones | 464/37 |
| 3,347,062 | 10/1967 | Schumann | 464/37 |
| 4,006,787 | 2/1977 | Rumpp | 464/37 X |
| 4,184,576 | 1/1980 | Kulischenko | 464/37 X |
| 4,327,563 | 5/1982 | Allmacher | 464/100 X |
| 4,707,154 | 11/1987 | Arai | 400/120 X |
| 4,733,250 | 3/1988 | Nozaki et al. | 346/76 PH |

FOREIGN PATENT DOCUMENTS

| | | |
|---|---|---|
| 59-182766 | 10/1984 | Japan . |
| 59-184685 | 10/1984 | Japan . |
| 200759 | 7/1923 | United Kingdom ................ 464/37 |

Primary Examiner—Edgar S. Burr
Assistant Examiner—Joseph R. Keating
Attorney, Agent, or Firm—Fitzpatrick, Cella, Harper & Scinto

[57] ABSTRACT

In a recording apparatus including a feed knob for manually feeding a recording sheet, a torque limiter is provided for preventing transmission of a torque more than a predetermined value from the feed knob to a recording sheet feeding portion.

3 Claims, 4 Drawing Sheets

RECORDING APPARATUS

BACKGROUND OF THE INVENTION

1. Field of the Invention

The present invention relates to a recording apparatus having a feed knob for conveying a recording sheet manually.

2. Related Background Art

A recording apparatus is shown wholly in FIG. 1, and a conventional mechanism for transmission of rotation in a sheet conveying system in the recording apparatus is shown in FIG. 2. FIG. 3 shows a connection between a feed knob and a recording sheet feed roller in the conventional transmission mechanism of FIG. 2. As shown in FIG. 2, the conventional transmission mechanism includes a feed knob 1 used for conveying a recording sheet manually and mounted on a shaft 2a of a sheet feed roller 2, and a feed motor as a driving source for normally drivingly rotating the feed roller 2.

The shaft 2a of the feed roller 2 has a D-cut end portion (FIG. 3) and the feed knob 1 has a mounting shaft portion having a corresponding D-cut hole formed therein, so that, when the feed knob 1 is mounted on the shaft 2a, a rotational torque from the feed knob can be transmitted to the feed roller 2. A depth or length that the knob is inserted onto the shaft 2a is regulated by a stopper ring 3 attached to the shaft 2a.

On the other hand, a driving force generated by the feed motor 4 is transmitted through a motor gear 5, transmission gear 6 and transmission gear 7 to a feed gear 8 to gradually reduce the speed of rotation from the feed motor. The feed gear 8 is coaxially and fixedly mounted on the shaft 2a of the feed roller 2 so that the feed roller 2 is rotated through the rotation of the feed gear 8. In this way, the rotation from the feed motor 4 is transmitted to the feed roller 2 through the reduction gear train to feed the recording sheet.

In FIG. 1, the recording sheet (not shown) is conveyed by the feed roller 2 in front of a recording head 9 mounted on a carriage 10 which can be shifted along a guide rod 11 by a carriage motor (not shown) through a timing belt 12 connected to the carriage. When the recording sheet reaches the recording position in front of the recording head 9, a leading edge portion of the recording sheet is held between an ejector roller 13 and a spur roller (not shown) in a spur guide 14. After recording is effected on the recording sheet through a scanning operation of the recording head 9 by means of the carriage 10, the recording sheet is conveyed by rotating the feed roller 2 by means of the feed motor 4.

The technique that both the manual sheet feed by means of the feed knob and the automatic sheet feed by means of the feed motor are used in the recording apparatus, as mentioned above, is already known as disclosed in the Japanese Patent Application Laid-Open No. 59-182766 and the Japanese Patent Application Laid-Open No. 59-184685 (corresponding to U.S. Pat. No. 4,733,250). Incidentally, U.S. Pat. No. 4,733,250 teaches a technique that a sheet feed and an up-down shift of the recording head are carried out by means of the same motor by switching a clutch according to the position of a carriage.

However, in the past, in the recording sheet conveying system of the recording apparatus, since the holding force of the feed motor was maximum when the feed knob was manually rotated in the same direction as a driving direction of the feed motor while driving the feed motor and since the driving speed from the feed motor was being reduced by the transmission gear train, the feed gear 8 was subject to a considerably large torque. Consequently, since the considerably strong force acted on the engagement portion between the transmission gear 7 and the feed gear 8, there arose a problem that the teeth of these gears were deformed and/or damaged.

On the other hand, recently, a sheet conveying apparatus with a short pitch and an improvement in accuracy of sheet conveying has been requested according to the tendency of the recording with high density. In this case, the speed ratio in the sheet conveying system must be increased. However, the more the speed ratio is increased, the more the force acting on the gears is increased.

SUMMARY OF THE INVENTION

An object of the present invention is to eliminate the above-mentioned drawbacks by providing a recording apparatus including a sheet conveying mechanism which does not cause a problem of deformation of gears even when a feed knob is manually rotated at a higher speed in the same direction while driving a feed motor.

Other objects of the present invention will be apparent from the following explanation regarding embodiments of the present invention.

DESCRIPTION OF THE PREFERRED EMBODIMENTS

The present invention will now be explained in connection with embodiments thereof with reference to the accompanying drawings.

Figure 1:
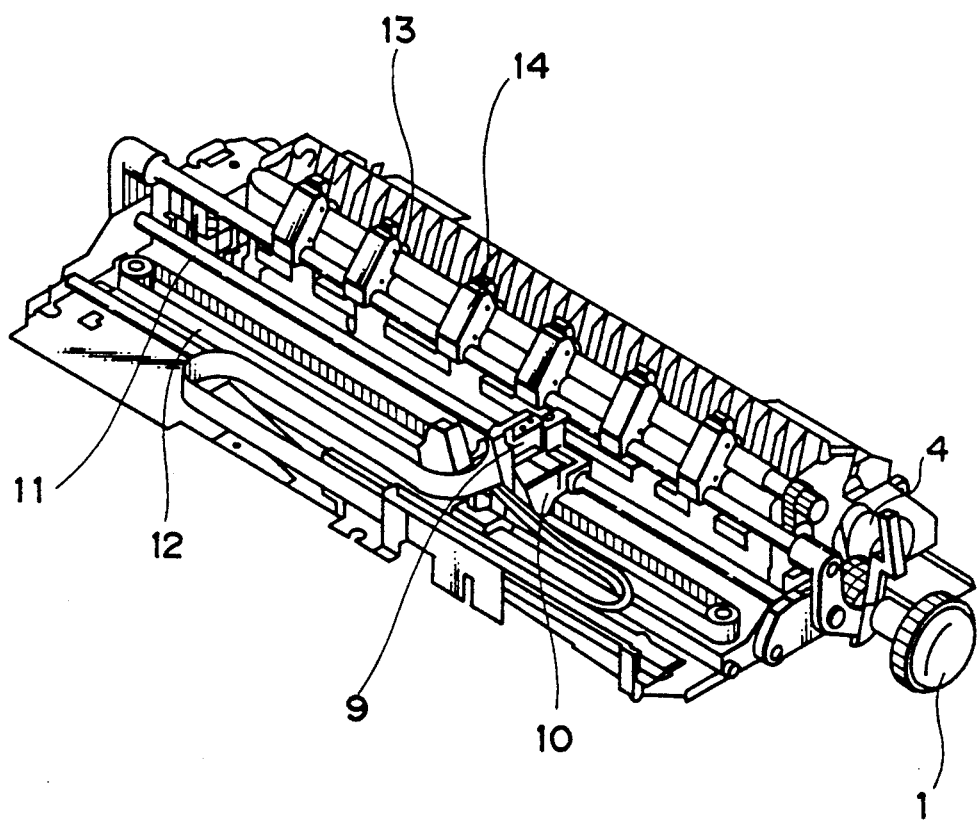
FIG. 1 is a perspective view of the whole recording apparatus.
Figure 2:
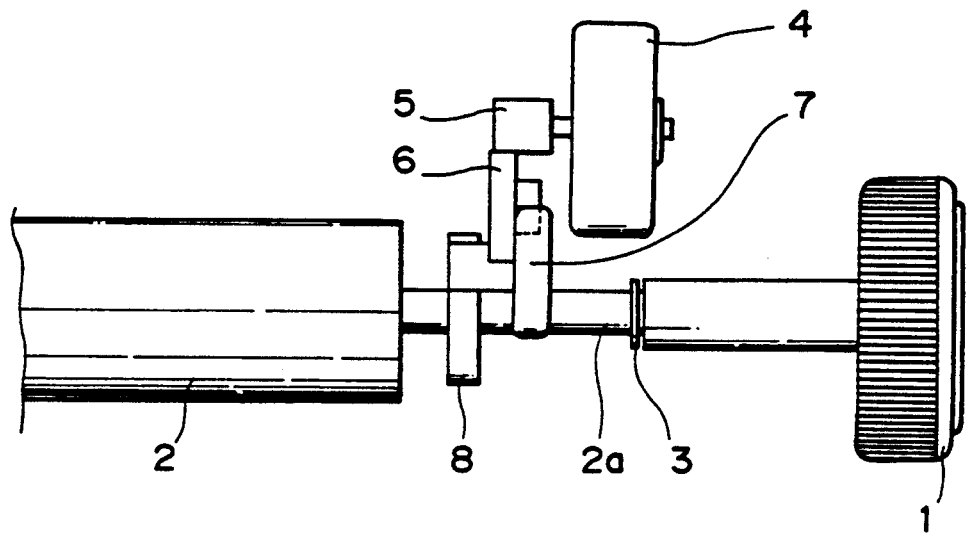
FIG. 2 is plan view of a conventional rotation transmission mechanism of a recording sheet conveying system associated with the recording apparatus of FIG. 1.
Figure 3:
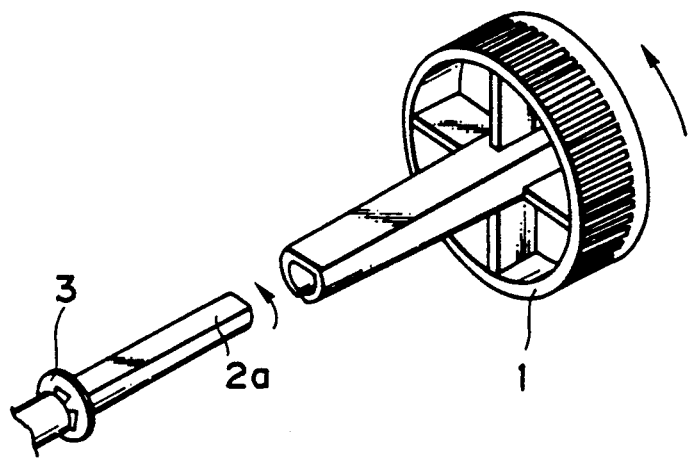
FIG. 3 is a perspective view showing a connection between a feed knob and a sheet feed roller in the transmission mechanism of FIG. 2.
Figure 4:
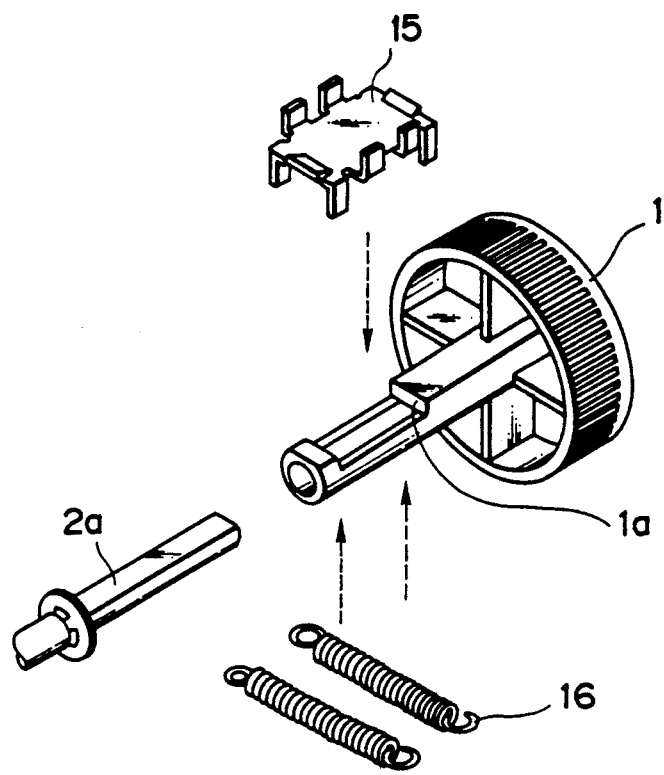
FIG. 4 is an exploded perspective view showing a connection between a feed knob and a sheet feed roller in a sheet feeding mechanism according to an embodiment of the present invention and associated with the recording apparatus of FIG. 1.
Figure 5:
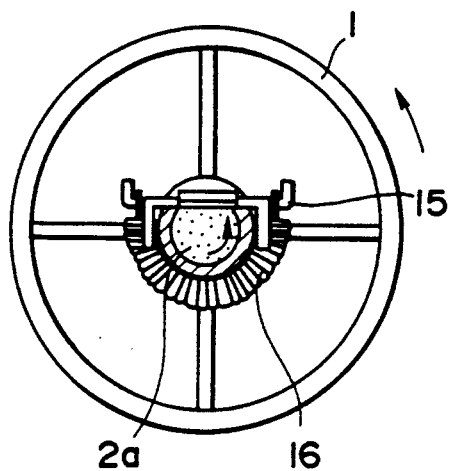
FIG. 5 is an end view of a mechanism shown in FIG. 4 for explaining a condition that a torque is being transmitted.
Figure 6:
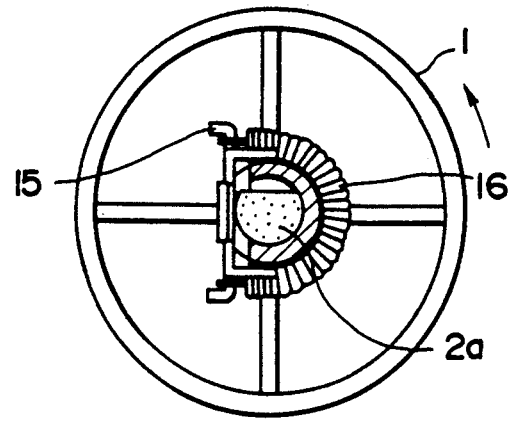
FIG. 6 is an end view of a mechanism shown in FIG. 4 for explaining a condition that a torque is not transmitted.

FIGS. 4 to 6 show an embodiment of the present invention, where FIG. 4 is a perspective view showing a connection between a feed knob and a sheet feed roller in a sheet feeding mechanism associated with the recording apparatus of FIG. 1, and FIGS. 5 and 6 are explanatory views for explaining the operation. A shaft 2a of a sheet feed roller (not shown) has a D-cut end portion and a feed knob 1 has a cylindrical inserting portion into which the shaft 2a is inserted. A cut-out or notch 1a is formed in the inserting portion of the feed knob 1. A holder plate 15 is fitted in the notch 1a and is held in place by means of springs 16 in such a manner that a flat portion of the holder plate 15 is pressed against the D-cut end portion of the shaft 2a to hold the shaft 2a in the inserting portion of the knob 1 in place. As shown in FIG. 5, in a normal condition, when the knob 1 is manually rotated, since the D-cut end portion of the roller shaft 2a is relatively firmly engaged by the holder plate 15 under the spring force of the knob springs 16, the shaft 2a, and accordingly the feed roller is rotated in synchronism with the rotation of the feed knob 1, thereby performing a manual feed of a recording sheet (not shown). However, in the case where the holding force is generated at a feed motor, as shown in FIG. 6, when the feed knob 1 is rotated manually, the springs 16 for holding the holder plate 15 are expanded, with the result that the feed knob 1 is slippingly rotated around the D-cut end portion of the roller shaft 2a, whereby a torque more than a predetermined value cannot be transmitted from the feed knob 1 to the feed roller.

Figure 7:
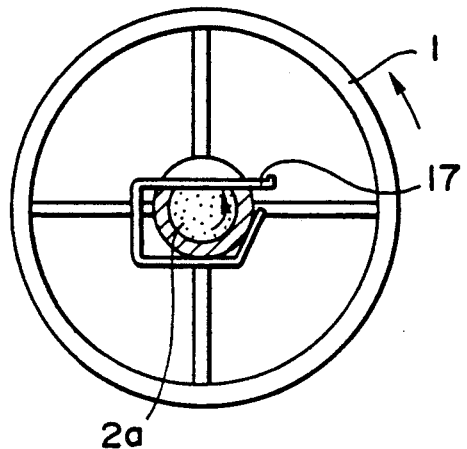
FIG. 7 is an end view similar to FIG. 5, but according to another embodiment of the present invention.
Figure 8:
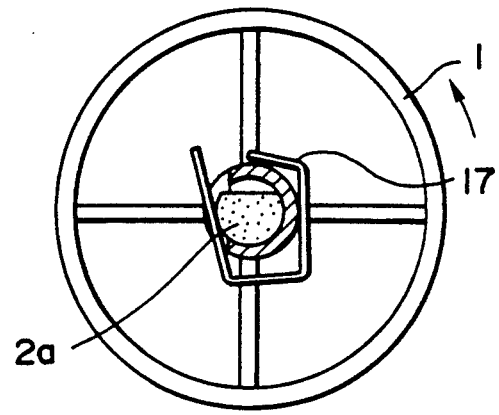
FIG. 8 is an end view similar to FIG. 7, but showing a condition that the torque is not transmitted.

FIGS. 7 and 8 show another embodiment of the present invention. In this embodiment, in place of the holder plate 15 and the knob spring 16 shown in FIG. 4, a single leaf spring 17 is used. In this case, the leaf spring 17 is fitted in the notch 1a of the feed knob 1 to firmly hold the D-cut end portion of the roller shaft 2a in the inserting portion of the feed knob 1 in place. As shown in FIG. 7, in a normal condition, when the feed knob 1 is manually rotated, the roller shaft 2a having the D-cut end portion is also rotated in synchronism with the rotation of the feed knob 1 due to the pressing force of the leaf spring 17 (rotating together with the feed knob), thereby performing a manual feed of the recording sheet. However, in the case where the holding force is generated at the feed motor, as shown in FIG. 8, when the feed knob 1 is rotated manually, the leaf spring 17 is expanded or opened, with the result that the feed knob 1 is slippingly rotated around the D-cut end portion of the roller shaft 2a, whereby a torque more than a predetermined value cannot be transmitted from the feed knob 1 to the feed roller.

Figure 9:
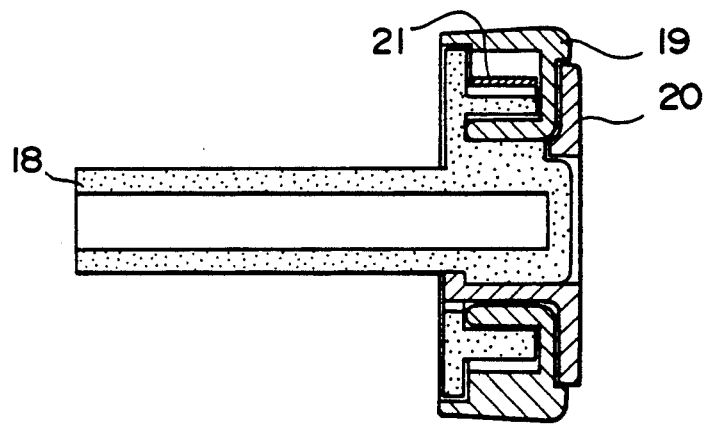
FIG. 9 is a longitudinal sectional view of a feed knob according to a further embodiment of the present invention and associated with the recording apparatus of FIG. 1.
Figure 10:
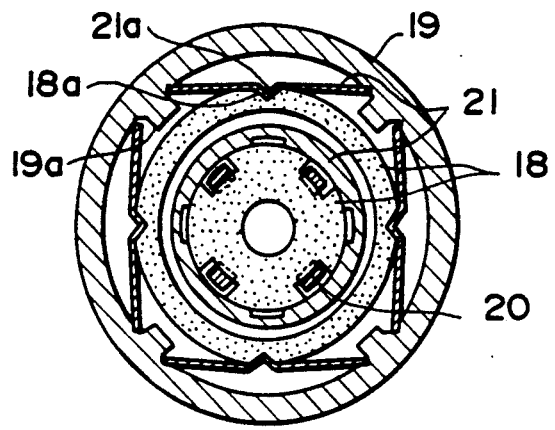
FIG. 10 is a cross-sectional view of the feed knob of FIG. 9.

FIGS. 9 and 10 are sectional views showing another embodiment of the present invention, where FIG. 9 is a longitudinal sectional view and FIG. 10 is a cross-sectional view. A feed knob 19 is rotatably mounted on a knob shaft 18, a knob stopper 20 prevents the knob 19 from slipping out from the knob shaft 18 in an axial direction thereof. Ratchet springs 21 comprising leaf springs are mounted between adjacent projections 19a formed on an inner surface of the feed knob 19, respectively, in such a manner that a V-shaped ridge 21a formed on each of the ratchet springs 21 is received in a corresponding one of V-shaped grooves 18 formed in the knob shaft 18. In this way, the relative rotational movement between the feed knob 19 and the knob shaft 18 is restrained.

The knob shaft 18 is mounted on the roller shaft (not shown) of the feed roller so that the knob shaft cannot rotate relative to the roller shaft. In a normal condition, when the feed knob 19 is manually rotated, the knob shaft 18 is also rotated through the engagement between the projections 21a of the ratchet springs 21 and the V-shaped grooves 18a in the knob shaft 18 in synchronism with the rotation of the feed knob 19, thus rotating the feed roller. In the case where the holding force is generated at the feed motor, when the feed knob 19 is rotated to shift the ratchet springs 21, the ratchet springs are flexed so that the V-shaped ridges 21a of the ratchet springs 21 slip out of the corresponding V-shaped grooves 18a in the knob shaft 18, with the result that the feed knob 19 is slippingly rotated around the knob shaft 18, whereby a torque more than a predetermined value cannot be transmitted from the feed knob 19 to the feed roller. In this way, for example, if the holding force is generated at the feed motor to apply a greater torque to the feed knob, since the feed knob is slippingly rotated, it is possible to prevent a considerably large load from being applied to the rotation transmission mechanism.

As mentioned above, according to the present invention, in the recording apparatus having a feed knob for manually feeding the recording sheet, when the feed knob is rotated while the holding force is being generated at the feed motor, as for example when the feed knob is subject to a larger torque as in the case where the feed knob is rotated at a higher speed in the same direction as the rotational direction of the feed motor while rotating the feed motor, since the feed knob is slippingly rotated upon application of torque more than a predetermined value, thus preventing the rotational torque of the feed knob from being transmitted to the recording sheet feeding system of the recording apparatus, the transmission mechanism such as the gears is not subject to greater load or force, thereby effectively preventing the deformation and/or damage of the gears.

I claim:

1. A recording apparatus comprising:
   a recording sheet feed roller for conveying a recording sheet, said recording sheet feed roller including a roller shaft;
   a feed gear fixed to said roller shaft, said feed gear driving said feed roller when rotated;
   driving means for rotating said feed gear, said driving means including a feed motor for generating a driving force for rotating said feed gear;
   a feed knob for manually driving said roller shaft, said feed knob having a torque limiter for limiting torque more than a predetermined value from being transmitted from said feed knob to said roller shaft, wherein
   said feed knob has a knob shaft which is rotatable relatively to said feed knob and fixed to said roller shaft, and said torque limiter comprises a spring member for applying a pressure between said knob shaft and said feed knob, wherein torque more than a predetermined value is not transmitted through said knob shaft to said roller shaft by the pressure of said spring member.

2. A recording apparatus comprising:
   a recording sheet feed roller for conveying a recording sheet, said recording sheet feed roller including a roller shaft;

a feed gear fixed to said roller shaft, said feed gear driving said feed roller when rotated;

driving means for rotating said feed gear, said driving means including a feed motor for generating a driving force for rotating said feed gear; and a feed knob for manually driving said roller shaft, said feed knob having a knob shaft which is rotatable relatively to said feed knob and fixed to said roller shaft, and said feed knob having a torque limiter which includes a spring member mounted on said feed knob and having a V-shaped ridge, and a groove formed in said knob shaft and adapted to receive said V-shaped ridge of said spring member, whereby a torque more than a predetermined value is not transmitted to said recording sheet feed means by a pressure generated by engagement between said V-shaped ridge and said groove.

3. A recording apparatus according to claim 1, wherein said feed knob is composed of a single unit.

* * * * *

UNITED STATES PATENT AND TRADEMARK OFFICE
CERTIFICATE OF CORRECTION

PATENT NO. : 5,018,886

DATED : May 28, 1991

INVENTOR(S) : Soichi Hiramatsu

It is certified that error appears in the above-identified patent and that said Letters Patent is hereby corrected as shown below:

COLUMN 4:

Line 38, "to greater" should read --to a greater--.

Signed and Sealed this

First Day of December, 1992

Attest:

DOUGLAS B. COMER

Attesting Officer     Acting Commissioner of Patents and Trademarks